(12) United States Patent
Daly et al.

(10) Patent No.: US 8,527,147 B2
(45) Date of Patent: Sep. 3, 2013

(54) METHODS AND SYSTEMS FOR AUTOMATIC DETECTION OF VEHICLE CONFIGURATION

(75) Inventors: Charles David Daly, Somerville, NJ (US); William H Jones, Jr., Ormond Beach, FL (US)

(73) Assignees: Circuit Works, Inc., Somerville, NJ (US); Metra Electronics Corporation, Holly Hill, FL (US)

( * ) Notice: Subject to any disclaimer, the term of this patent is extended or adjusted under 35 U.S.C. 154(b) by 0 days.

(21) Appl. No.: 13/539,965

(22) Filed: Jul. 2, 2012

(65) Prior Publication Data
US 2012/0271485 A1   Oct. 25, 2012

Related U.S. Application Data

(63) Continuation of application No. 12/545,429, filed on Aug. 21, 2009, now Pat. No. 8,214,105.

(51) Int. Cl.
*G06F 7/00*   (2006.01)

(52) U.S. Cl.
USPC ............... 701/36; 702/57; 702/66; 370/252; 370/254; 370/257; 370/241; 340/259; 710/305

(58) Field of Classification Search
USPC ............. 701/36; 702/57, 66; 370/252, 254, 370/257; 340/579, 259
See application file for complete search history.

(56) References Cited

U.S. PATENT DOCUMENTS

| | | | |
|---|---|---|---|
| 3,903,472 A | 9/1975 | Wahl | |
| 4,771,283 A | 9/1988 | Imoto | |
| 4,792,783 A | 12/1988 | Burgess et al. | |
| 5,339,362 A | 8/1994 | Harris | |
| 5,559,499 A | 9/1996 | Haubner | |
| 5,790,065 A | 8/1998 | Yaroch | |
| 5,790,481 A | 8/1998 | Meitner | |

(Continued)

FOREIGN PATENT DOCUMENTS

| | | |
|---|---|---|
| CA | 2708665 A1 | 2/2011 |
| CN | 2004 1 0030511 | 3/2004 |

(Continued)

OTHER PUBLICATIONS

PAC SWI-Jack Universal Steering Wheel Control Interface—Installation Instructions (date unknown).

(Continued)

*Primary Examiner* — Cuong H Nguyen
(74) *Attorney, Agent, or Firm* — Fitzpatrick, Cella, Harper & Scinto

(57) ABSTRACT

A method for automatically detecting a control signal configuration of a vehicle component includes making a connection to a channel of the component, performing an electrical measurement on the channel, and identifying a control signal configuration based upon the measurement. A method for sending control signals from one vehicle component to another includes making a connection on a channel of one component, making a connection to a channel of the other component, performing electrical measurements on the channels, identifying control signal configurations based upon the measurements, and configuring a control signal interface. A control signal interface includes an input unit, a signal processing unit, and an output unit. The input and output units each can connect to a channel of a vehicle component and perform an electrical measurement. The signal processing unit can determine control commands based upon control signals.

17 Claims, 7 Drawing Sheets

(56) References Cited

U.S. PATENT DOCUMENTS

| | | | |
|---|---|---|---|
| 5,903,259 A | 5/1999 | Brusky et al. | |
| 5,999,996 A | 12/1999 | Dunn | |
| 6,005,488 A | 12/1999 | Symanow et al. | |
| 6,009,363 A * | 12/1999 | Beckert et al. | 701/1 |
| 6,032,089 A | 2/2000 | Buckley | |
| 6,067,302 A | 5/2000 | Tozuka | |
| 6,097,520 A | 8/2000 | Kadnier | |
| 6,114,970 A | 9/2000 | Kirson et al. | |
| 6,141,710 A | 10/2000 | Miesterfeld | |
| 6,148,251 A | 11/2000 | Downs | |
| 6,253,131 B1 | 6/2001 | Quigley et al. | |
| 6,396,164 B1 | 5/2002 | Barnea et al. | |
| 6,397,186 B1 | 5/2002 | Bush et al. | |
| 6,674,750 B1 * | 1/2004 | Castellano | 370/354 |
| 6,729,432 B1 | 5/2004 | Yao et al. | |
| 6,823,457 B1 | 11/2004 | Berstis et al. | |
| 6,862,357 B1 | 3/2005 | Albus et al. | |
| 6,862,505 B2 | 3/2005 | Satoh et al. | |
| 6,865,460 B2 | 3/2005 | Bray et al. | |
| 6,907,328 B2 | 6/2005 | Fehr et al. | |
| 6,956,952 B1 | 10/2005 | Riggs | |
| 7,020,289 B1 | 3/2006 | Riggs | |
| 7,126,583 B1 | 10/2006 | Breed | |
| 7,177,730 B2 | 2/2007 | Daly et al. | |
| 7,222,207 B2 | 5/2007 | Falcon | |
| 7,254,482 B2 | 8/2007 | Kawasaki et al. | |
| 7,275,027 B2 | 9/2007 | Sproule et al. | |
| 7,295,608 B2 | 11/2007 | Reynolds et al. | |
| 7,302,312 B2 * | 11/2007 | Murray et al. | 700/250 |
| 7,372,837 B2 | 5/2008 | Kinjo et al. | |
| 7,450,961 B1 | 11/2008 | Heubel et al. | |
| 7,489,786 B2 | 2/2009 | Marlowe | |
| 7,496,434 B2 | 2/2009 | Fossen et al. | |
| 7,596,636 B2 | 9/2009 | Gormley | |
| 7,676,062 B2 | 3/2010 | Breed et al. | |
| 7,684,570 B2 | 3/2010 | Riggs | |
| 7,689,198 B2 | 3/2010 | Deng et al. | |
| 7,769,342 B2 | 8/2010 | Tabe | |
| 8,014,540 B2 | 9/2011 | Riggs | |
| 8,014,920 B2 | 9/2011 | Daly et al. | |
| 8,036,265 B1 | 10/2011 | Reynolds et al. | |
| 2002/0084910 A1 | 7/2002 | Owens et al. | |
| 2003/0007649 A1 | 1/2003 | Riggs | |
| 2004/0045030 A1 | 3/2004 | Reynolds et al. | |
| 2004/0138795 A1 | 7/2004 | Alkarawi et al. | |
| 2005/0125121 A1 | 6/2005 | Isaji et al. | |
| 2005/0249358 A1 | 11/2005 | Riggs | |
| 2006/0052167 A1 | 3/2006 | Boddicker et al. | |
| 2006/0198535 A1 | 9/2006 | Riggs | |
| 2006/0200364 A1 | 9/2006 | Riggs | |
| 2006/0213755 A1 | 9/2006 | Chang et al. | |
| 2007/0140187 A1 | 6/2007 | Rokusek et al. | |
| 2007/0208469 A1 | 9/2007 | Wille et al. | |
| 2007/0282506 A1 | 12/2007 | Breed et al. | |
| 2008/0065291 A1 | 3/2008 | Breed | |
| 2008/0096654 A1 | 4/2008 | Mondesir et al. | |
| 2008/0130912 A1 | 6/2008 | Marlowe | |
| 2008/0144705 A1 | 6/2008 | Rackin et al. | |
| 2008/0246850 A1 | 10/2008 | Marlowe | |
| 2009/0010448 A1 | 1/2009 | Voto et al. | |
| 2009/0034750 A1 | 2/2009 | Ayoub et al. | |
| 2009/0062982 A1 | 3/2009 | Obata et al. | |
| 2009/0075624 A1 | 3/2009 | Cox et al. | |
| 2009/0189373 A1 | 7/2009 | Schramm et al. | |
| 2010/0040237 A1 | 2/2010 | Riggs | |
| 2010/0226278 A1 | 9/2010 | Borsos et al. | |
| 2010/0233965 A1 | 9/2010 | Fukuoka | |
| 2010/0268426 A1 | 10/2010 | Pathak et al. | |
| 2010/0312433 A1 | 12/2010 | Preston et al. | |
| 2011/0022766 A1 * | 1/2011 | Beckmann et al. | 710/305 |
| 2011/0046788 A1 | 2/2011 | Daly et al. | |
| 2011/0046816 A1 | 2/2011 | Daly et al. | |
| 2011/0169750 A1 | 7/2011 | Pivonka et al. | |

FOREIGN PATENT DOCUMENTS

| | | |
|---|---|---|
| GB | 2460923 A | 12/2009 |
| JP | 2006-073712 A | 3/2006 |
| JP | 2007-219283 A | 8/2007 |
| JP | 2009-051334 A | 3/2009 |
| MX | 2010008517 A | 7/2011 |
| TW | 94109467 | 3/2005 |
| WO | 2005/096310 A1 | 10/2005 |
| WO | 2007/111177 A1 | 10/2007 |
| WO | 2011/088218 A1 | 7/2011 |

OTHER PUBLICATIONS

PAC SWI-X Universal Steering Wheel Control Interface—Installation Instructions (date unknown).
PAC SWI-CAN CAN—Data Bus Steering Wheel Control Interface for use with a SWI-ECL, SWI-JACK, SWI-PS, or SWI-X—Installation Instructions (date unknown).
Peripheral Electro. PESWICAN2-Can Data Bus Steering Wheel Interface for Use With a PESWIAKJC. PESWIECL, PESWIPS or PESWIX—Installation Instructions (date unknown).
Wiring Diagram for 1998 Cadillac Seville (date unknown).
Soundgate REMPIOTOY Installation Instructions (date unknown).
Soundgate REMPIOGMV2 Installation Instructions (date unknown).
Peripheral Electronics News Room—Wanted: SKU Killer for Chrysler, Dodge & Jeep, CHYAH08 (Apr. 1, 2009).
A Survey of Challenges Related to the Design of 3D User Interfaces for Car Driers; Tonnis, M.:; Broy, V.; Kinker, G.; 3D User Interfaces, 2006. 3DUI 2006. IEEE Symposium on; Digital Object Identifier: 10.1109/VR,.2006.19 Publication Year: 2006, pp. 127-134.
Eye gaze and movement behaviour in the operation of adaptive in-car touchscreens; Bachfischer, K; Waeller, C; Troesterer, S.; Tatzel, A.; Leon, F.P.; Intelligent Vehicles Symposium, 2008 IEEE; Digital Object Identifier: 10.1109/IVS.2008.4621138 Publication Year: 2008, pp. 1027-1032.
An Eyes-Free In-car User Interface Interaction Style Based on Visual and Textual Mnemonics, Chording and Speech; Sandnes, F.E.; Yo-Ping Huang; Yeh-Min Huang; Multimedia and Ubiquitous Engineering, 2008, MUE 2008. International Conference on Digital Object Identifier: 10.1109/MUE.2008.50; Publication Year: 2008, pp. 342-347.
A haptically enabled CAN-based steering wheel controller; Hogan, P.; Nahavandi, S.; Mullins, J.; Industrial Electronics & Applications (ISIEA), 2010 IEEE Symposium on; Digital Object Identifier: 10.1109/ISIEA.2010.5679418 Publication year: 2010, pp. 487-492.
PAC SWI-2 Steering Wheel Radio Control Interface Packaging (2000) and Installation instructions (Jul. 11, 2001 revision), 4 pgs.
Soundgate Interfaces, Winter/Spring 1997 Product Guide (1996).
Soundgate Interfaces, Spring 1997 Product Catalog (1997).
Soundgate Interfaces, Winter 1998 Product Catalog (1998).
Soundgate Interfaces FRDSW1 Packaging (1997) and Installation Instructions (1996-1998).
Soundgate Interfaces GMSW1 Packaging (date unknown) and Installation Instructions (1996-1998).
Sonicelectronix.com, Axxess ASWC Universal Steering Wheel Control Interface, Product Sales page (captured Sep. 8, 2010).
AXXESS Catalog, Retain Steering Wheel Controls, 2008.
OEM Steering Control Interface for Parrot Bluetooth CK3000, InCarTec (date unknown).
"Soundgate Dealers", Apr. 29, 1998.
Soundgate #FRDSW2 Installation Instructions, Oct. 10, 1998.
"Announcing . . . The SoundGate Steering Wheel Control Interface for Alpine Receivers", Sep. 10, 1999.
GMSW1, and SWC2 thru SWC9 Installation instructions, 1997.
"New Machines", Car Audio and Electronics, Sep. 1997, pp. 20-24.
"Lightning Audio's Steering Wheel Control Module", Car Audio and Electronics, Sep. 1999, pp. 90-93.
Study on Identification of Driver's Intentions Based on Cloud Model; Bai Jingwen; Zhang Licai; E-Product E-Service and E-Entertainment (ICEEE), 2010 International Conference on; Digital Object Identifier: 10.1109/ ICEEE.2010.5660134 Publication Year: 2010, pp. 1-4.

http://compare.ebay.com/like/
290525894581?Ityp=AllFixedPriceItemTypes&var=-sbar&rvr.
sub.--id=211166428650&crip=1.sub.--263602.sub.--304662
&UA=WXI7&GU-ID=5790a65b12c0a0e203e7e4a7ff52a5e8
&itemid=290525894581&ff4=263602.sub.--3- 04662 (for Cadillac Escalade steering wheel controls posted on eBay Feb. 21, 2011).

SAAB bluetooth 98-93 hand free (date unknown).

Terrain mapping for autonomous vehicle by training; Ho Yeong Khing; Soon Ing Yaan; Sim Ai Poh; Tan Chee Wah; Motion Control Proceedings, 1993., Asia-Pacific Workshop on Advances in; Digital Object Identifier: 10.1109/ APWAM.1993.316206; Publication Year: 1993, pp. 153-158.

Development of New Mobility Assistive Robot for Elderly People with Body Functional Control; Kaneshige, Y.; Nihei, M.; Fujie, M.G.; Biomedical Robots and Biomechatronics, 2006. BioRob 2006. The First IEEE/RAS-EMBS International Conference on; Digital Object Identifier: 10.1109/BIOROB.2006.1639070; Publication Year: 2006, pp. 118-123.

Active Four-Wheel-Steering Design for an Advanced Vehicle; Leucht, Philip M.; American Control Conference, 1988; Publication Year: 1988, pp. 2379-2384.

* cited by examiner

METHODS AND SYSTEMS FOR AUTOMATIC DETECTION OF VEHICLE CONFIGURATION

This application is a continuation of U.S. patent application Ser. No. 12/545,429, which was filed on Aug. 21, 2009 now U.S. Pat. No. 8,214,105, the full content of which is hereby incorporated by reference.

BACKGROUND OF THE INVENTION

1. Field of the Invention

This invention generally relates to providing control signals to an aftermarket component installed in a vehicle. More specifically, the invention relates to a steering wheel control interface that can detect particular vehicle and aftermarket component configurations and properly transmit steering wheel control signals to the aftermarket component.

2. Description of the Related Art

Vehicle owners often seek to replace factory-installed audio and video components with aftermarket components. These aftermarket components often must be hard-wired to a vehicle's factory wiring. This may require that a user connect various power, audio, and video wires, and further that the aftermarket component communicate and operate, in part, through such wiring. Many modern vehicles include controls on their steering wheels for operating factory-installed components. These steering wheel controls (SWC) may, for example, increase the volume of a radio, increase the track of a CD being played, or change from one audio source to another. However, the particular configuration of a vehicle's steering wheel controls differs significantly among vehicle makes, models, and model years. Accordingly, it is very difficult for manufacturers of aftermarket components to provide compatibility between their components and the wide array of steering wheel control configurations.

U.S. Pat. Nos. 7,020,289 and 6,956,952 describe hardwired interfaces for handling SWC signals. A commercial product similar to such interfaces is a SWI-JACK interface manufactured by the Pacific Accessory Corporation (PAC). The SWI-Jack interface has a wire harness on an input side and an output plug on an output side. To install the input side, an installer first selects a particular wire from among many included on the wire harness. The selection is made based upon a lengthy chart, which indicates suitable wires for particular vehicle makes and models. Once selected, the installer electrically connects the selected wire to a steering wheel audio control wire, which provides an output signal from the steering wheel audio controls. The SWI-JACK interface is geared to audio control wires provided within the steering column or underneath the vehicle's dashboard. To install the output side, the installer couples the output plug to a wired remote-control input on an aftermarket head-unit. Once the input and output sides have been installed, the installer completes installation by adjusting an input switch on the SWI-JACK. The adjustment is made according to the manufacturer of the aftermarket head unit.

There are several drawbacks to an interface such as the SWI-JACK. First, the interface is not designed to function upon installation. Rather, the installer must perform a lengthy programming process, with pressing and releasing the respective buttons on the steering wheel controls according to an installation sequence. The process is not only lengthy, but unforgiving. If the installer does not correctly perform the sequence, he must start the sequence over. Second, there can be several wires provided within a vehicle's steering column or dashboard. As a result, the installer may choose the wrong wire when attempting to electrically connect the interface to the steering wheel audio control wire. This could permanently damage components within the vehicle and compromise vehicle safety. A related drawback results from requiring the installer to choose a particular wire from the many wires of the wiring harness: if the installer selects the wrong wire from the harness, damage or malfunction to either the SWI-JACK or the vehicle can result. Furthermore, an inherent drawback of passive component interfaces, such as the SWI-JACK, is that they are compatible only with a limited number of manufacturers of aftermarket radios.

Another type of interface incorporates wireless transmission to relay SWC signals to the aftermarket component. Products manufactured with this design include the SWI-X interface by PAC and the REMOTE series interface by SoundGate. Generally speaking, these interfaces have a wire harness and an infrared (IR) receiver on an input side, and an IR transmitter on an output side. Installation of the input side proceeds in a manner similar to that described above in connection with the SWI-JACK. Installation of the output side involves mounting and aiming the IR transmitter such that it can communicate with an IR receiver integrated with the aftermarket component.

This design has several limitations, one of which is the lengthy programming process. The input and output sides having been installed, the installer must perform a wireless remote control "learning" process. For each steering wheel audio control button, the installer must use the remote control provided with the aftermarket component to emit an IR signal to the interface's IR receiver. The interface then "learns" the IR signal and stores its signal format for future reproduction, similar to a process used in learning television remote controls. The interface cannot reproduce an IR signal according to the steering wheel audio control inputs until this learning process has been performed.

The wireless interface design also fails to overcome the drawbacks of the SWI-JACK interface. The installer must connect the appropriate steering wheel audio control wire, risking permanent damage and malfunction to the vehicle and the interface. And if the installer incorrectly performs any part of the programming process, he must start over, leading to frustration.

Some methods of communication between a vehicle's electrical components are known. U.S. Pat. Nos. 7,275,027, 6,114,970, 6,823,457, 6,141,710, and 6,396,164 describe interconnections between a factory-configured vehicle bus (OEM bus) and a device bus for aftermarket products and accessories. These interconnections generally use a gateway controller. However, in these devices, the vehicle and device bus structures are pre-determined. In this configuration, the gateway controller merely translates between a single set of OEM bus commands and a single set of device bus commands. Thus, these gateway controllers are tied to a specific vehicle bus and/or device bus architecture. Accordingly, they are inapplicable to universal aftermarket products.

As the above discussion makes clear, there is a need to provide a simple, universal solution for providing SWC inputs of all makes and models to aftermarket radios from a wide variety of manufacturers. In particular, an installer can benefit from a device which automatically detects at its input an SWC signal and which configures itself accordingly. Additionally, installers can further benefit from a device which automatically detects an aftermarket component and which further configures itself accordingly. In this manner, the device allows for a simple "plug-and-play" installation process, reducing the stress and risks of installation for both professional and self-installers.

SUMMARY OF THE INVENTION

The present invention addresses the challenges in the art discussed above.

According to one aspect of the invention, an input side of an SWC interface can connect to one or more steering components that transmit SWC signals. The connection can be made by hard-wiring the SWC interface to the steering components. In this aspect, the SWC interface can automatically detect each transmitted SWC signal. Automatic detection can include differentiating among multiple SWC signals and determining the meaning (e.g., "volume up," "seek down") of each signal.

According to another aspect of the invention, an input side of an SWC interface can connect to a vehicle bus on which SWC signals are transmitted. The connection can be made by, for example, hard-wiring the SWC interface to the bus or connecting a plug associated with interface into a suitable jack associated with the bus. The bus, which may or may not be factory-installed and factory-configured, can be one that is configured to transmit SWC signals as well as other signals associated with other vehicle components. These other components may or may not be related to audio components, video components, or other entertainment components of the vehicle. In this aspect, the SWC interface can automatically detect SWC signals transmitted on the bus. Automatic detection can include differentiating SWC signals from various signals transmitted on the bus and determining the meaning (e.g., "volume up," "seek down") of each signal.

According to yet another aspect of the invention, an output side of an SWC interface can be connected to an aftermarket component. The connection can be hard-wired or over a bus. Through this connection, the SWC interface can deliver SWC signals to the aftermarket component. Delivery of SWC signals by the SWC interface may include reformatting of the signals by the interface. In this aspect, the SWC interface can automatically detect the aftermarket component. Automatic detection can include determining the particular manufacturer and model number of the component. Automatic detection can further include determining a mode for delivery of SWC signals.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments of the invention presented herein will become more apparent from the detailed description set forth below when taken in conjunction with the drawings. Like reference numbers between two or more drawings can denote identical or functionally similar elements unless the description indicates otherwise.

DETAILED DESCRIPTION OF THE EXAMPLE EMBODIMENTS

Figure 1:
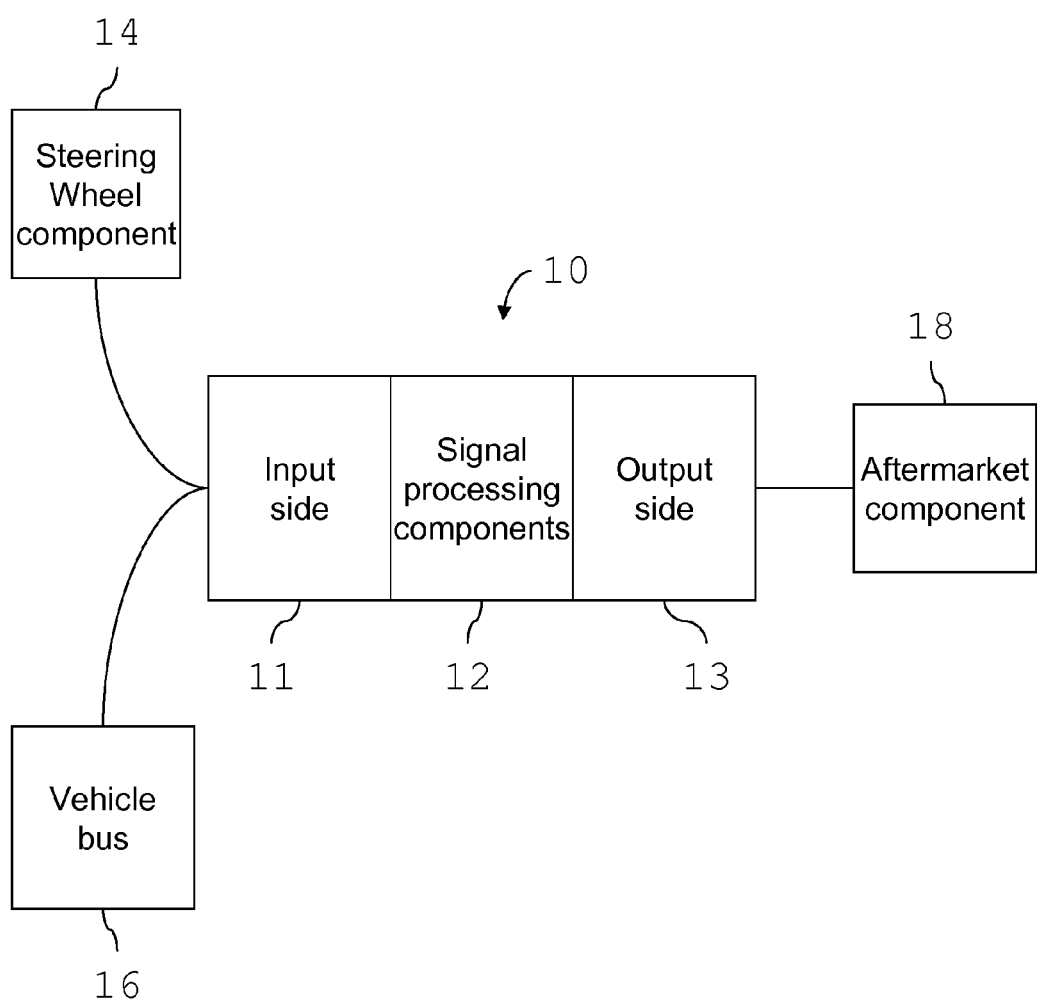
FIG. 1 shows a top-level block diagram of a device suitable for use in various embodiments of the invention.

As described above, various aspects of the invention provide for SWC interfaces that can automatically detect factory-installed and aftermarket components and buses.

Vehicles may transmit signals from a steering wheel to various factory-installed components in various ways. The method of transmission can vary among vehicle makes and models. One common method is a variable resistance method. In this method, the steering wheel component can be, for example, a button provided with an arrangement of switches and resistors. Operation of the button by pressing closes or opens a switch. In turn, this operation changes the resistance on an output line. The output line is wired to a factory-installed component, such as an OEM radio. The variable resistance is fed into the component, which decodes the resistance and translates the change in resistance into the operation of the steering wheel button.

Another common method is to use a data bus. This method, which is common in many modern vehicles, incorporates a data bus architecture to send signals and commands among the various electrical components of a vehicle. Known architectures include J1850, CAN-BUS, and K-BUS. In this method, circuitry is coupled to a steering wheel button. This circuitry transmits digital signal commands along the data bus when the button is pressed. The OEM radio monitors the data bas for the commands. Operation of the radio is controlled according to commands received by the radio over the bus.

As noted above, the transmission of SWC signals from steering wheel components can vary from vehicle to vehicle. An auto-detection method suitable for an individual vehicle thus can depend, broadly speaking, on the method of transmission used in that vehicle, and, more specifically, on the particular electronic configuration of its steering wheel components. Accordingly, one aspect of the invention provides methods for auto-detecting SWC signals among many makes and models of vehicles. These methods will now be described.

In a vehicle where SWC signals are transmitted by a variable resistance method, the SWC signals can be auto-detected by measuring characteristic voltages or other electronic properties associated with that vehicle's SWC components. In many vehicles configured according to a variable resistance method, SWC signals are transmitted on channels configured with a standby resistance. That is, even when no SWC signal is being transmitted on a channel—as may be the case when, for example, the "volume up" steering wheel button is not depressed—a small electrical current nonetheless is drawn by the standby resistance. In these instances, an SWC interface can be configured to measure, for example, a characteristic voltage exhibited by the channel. This voltage can be measured by the SWC interface using, for example, a resistor pulled up to a suitable voltage, such as 5 V or 12 V, depending on the particular SWC configuration of the vehicle, or a resistor pulled down to ground. To measure the characteristic voltage, a resistor pulled up to a suitable voltage may be used when a vehicle's standby resistance is pulled down to ground, while a resistor pulled down to ground may be used when a vehicle's standby resistance is pulled up to a particular voltage.

The following examples illustrate the principle of a characteristic voltage. Consider two hypothetical vehicles, A and B, each having an SWC channel that transmits a "volume up" signal. In vehicle A, the channel operates between 0 V and 5 V and has a standby resistance of 6 kΩ that pulls down to ground. In vehicle B, the channel operates between 0 V and 5 V and has a standby resistance of 24 kΩ that pulls down to ground. If an SWC interface with a pull-up resistance of 1 kΩ is connected to the channel of vehicle A, the voltage in front of the pull-up resistance will be 4.29 V. Thus, 4.29 V is a characteristic voltage of the volume up channel of vehicle A. On the other hand, if an SWC interface with a pull-up resistance of 1 kΩ is connected to the channel of vehicle B, the voltage in front the pull-up resistance will be 4.80 V. Thus, 4.80 V is a characteristic voltage of the volume up channel of vehicle B.

In some embodiments of the invention, the SWC signals of a particular vehicle can be auto-detected based on the characteristic voltage of individual SWC channels. In this aspect of the invention, an SWC interface can be electrically connected to the channels of a vehicle's steering wheel components. Because each SWC channel of a particular vehicle may a characteristic voltage, patterns among the characteristic voltages of the channels can be used by the SWC interface. For example, a particular vehicle manufacturer may configure its vehicles such that each SWC channel has a characteristic voltage of 4.29 V when measured by a pull-up resistance of 1 kΩ. Another manufacturer may configure its vehicles such that each SWC channel has a characteristic voltage 4.80 V when measured by a pull-up resistance of 1 kΩ. Yet another manufacturer may configure its vehicles such that each SWC channel has a characteristic voltage of 1.20 V when measured by a pull-down resistance of 4.7 kΩ. Those having skill in the art will recognize that there are many patterns possible, and that such patterns may vary depending on, for example, a vehicle's make, model, and year. A configuration of an SWC interface suitable for auto-detecting SWC signals transmitted over a variable resistance network is discussed below in connection with FIGS. 2A and 2B.

Although some embodiments directed to auto-detecting a vehicle's variable resistance network may utilize electrical currents drawn by a standby resistance, the invention does not require a standby resistance to be operable. For example, the SWC channels in some vehicles do not have a detectable standby resistance. In this instance, auto-detection may proceed in conjunction with an instruction to an installer to operate one or more SWC components, e.g., the installer may be instructed to press and hold an SWC volume up button for the duration of the detection phase.

Turning now to vehicles where SWC signals are transmitted by a data bus method, SWC signals can be auto-detected by determining a particular vehicle's bus type from among known communication protocols. In vehicles configured with a data bus, data bits are transmitted on the bus at a predetermined frame rate. The frame rate of a particular bus can depend on the communication protocol used by the bus. Thus, different busses may transmit data bits at different frame rates. For example, General Motors' GMLAN bus transmits frames at 33.33 kb/s, while Chrysler's CAN bus transmits frames at 83.33 kb/s. Thus, by determining the transmission rate of a vehicle's bus, the SWC interface also can determine the type of data bus used in the vehicle. Because data bus types among vehicle manufacturers are often highly proprietary, a determination of bus type can be sufficient to allow a designer of an SWC interface to configure the interface to differentiate among signals transmitted on the data bus and to decode individual SWC signals.

In some embodiments of the invention, SWC signals of a particular vehicle can be auto-detected based on a determination of a communication protocol of the vehicle data bus. In these embodiments, an SWC interface can be electrically connected to the data bus by, for example, a jack, a plug, or manual connection of electrical wires. In some vehicles, connecting an SWC interface and providing electrical power to the vehicle can be sufficient to allow the SWC interface to auto-detect SWC signals. This is because some vehicles transmit SWC data frames even when no steering wheel component is being operated, e.g., when no button is depressed. Thus, there are embodiments in which an SWC interface can determine the frame rate of the vehicle's data bus without any manual operation of a steering wheel component. In other vehicles, however, a steering wheel component may need to be operated in order to have data frames transmitted on the bus and to allow for a determination of the frame rate. Auto-detection of SWC signals in these vehicles may require manual operation of one or more steering wheel components. For example, an installer may need to press a steering wheel button at one-second intervals during an auto-detection process performed by the SWC interface. A configuration of an example SWC interface suitable for auto-detecting SWC signals transmitted on a vehicle bus is discussed below in connection with FIG. 2C.

There are some embodiments of the invention in which an SWC interface is electrically connected to variable resistance network, and there are other embodiments in which an SWC interface is electrically connected to a vehicle data bus. However, the invention is not limited to one electrical connection or the other; in some embodiments an SWC interface can connect both to a vehicle's variable resistance network and to the vehicle's data bus. In these embodiments, an auto-detection process can proceed according to information gained from both connections, as will be recognized by those having skill in the art. For example, although a connection to a variable resistance network may yield characteristic voltages of that network, this information may not be sufficient to auto-detect the vehicle's SWC signals. That is, any pattern identified in the characteristic voltages may not be sufficiently unique to configure an SWC interface. However, a connection to the vehicle bus can allow an SWC interface to determine other information besides a data frame rate, such as the vehicle's unique vehicle identification number (VIN). This information obtained from the data bus, together with the pattern of characteristic voltages, may be sufficient to allow the SWC interface to auto-detect SWC signals. Thus, the auto-detection process can be performed using both connections, where one connection or the other may not have been sufficient.

FIG. 1 shows a top-level block diagram of an SWC interface according to an embodiment of the invention. SWC interface 10 includes an input side 11 and an output side 13. Input side 11 can include one or more components configured to auto-detect SWC signals that are transmitted from a steering wheel component 14 or on a vehicle bus 16. Specific features of input side 11 are discussed below in connection with FIGS. 2A-C. Output side 13 includes one or more components configured to auto-detect aftermarket component 18 and further configured to deliver SWC signals to aftermarket component 18. Specific features of output side 13 are discussed below in connection with FIG. 3. SWC interface 10 further can include signal processing components 12, which can process SWC signals received at input side 11 prior to outputting the signals at output side 13. In various embodiments of the invention, processing of SWC signals by signal processing components 12 can depend upon auto-detections performed at input side 11 and output side 13.

The manner in which SWC signals are auto-detected can depend on the configuration of interface 10. For example, if interface 10 is configured to auto-detect signals transmitted from a steering wheel component—as may be the case when a vehicle transmits SWC signals using a variable resistance method—input side 11 can include a wiring harness (not shown), through which interface 10 can be hard-wired to steering wheel component 14. As another example, if interface 10 is configured to auto-detect signals transmitted on a vehicle bus—as may be the case when a vehicle transmits SWC signals on a bus—input side 11 can include a plug which connects to a jack associated with vehicle bus 16.

Figure 2A:
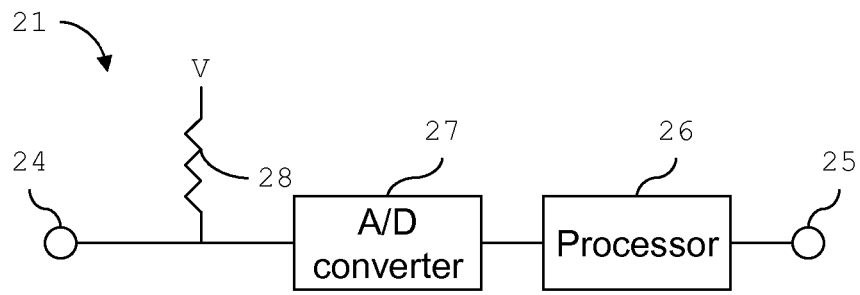
FIG. 2A shows a top-level block diagram of an example circuit according to one aspect of the invention.
Figure 2B:
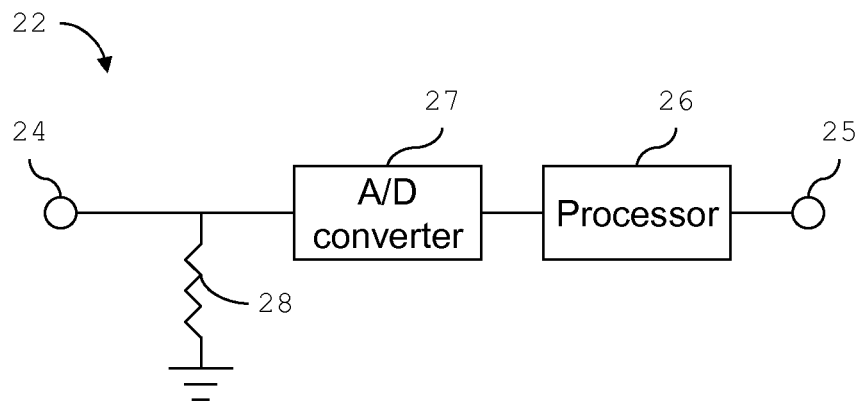
FIG. 2B shows a top-level block diagram of another example circuit according to the same aspect of the invention as illustrated in FIG. 2A.
Figure 2C:
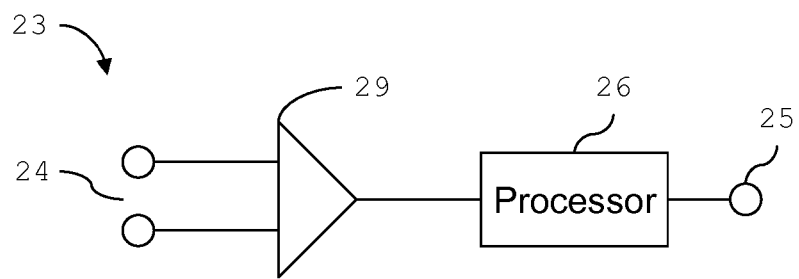
FIG. 2C shows a top-level block diagram of an example circuit according to another aspect of the invention.

FIGS. 2A-C show top-level block diagrams of example circuits capable of auto-detecting SWC signals. In some embodiments of the invention, these circuits may be used individually, while in other embodiments they may be used in combination. As noted above, these circuits can comprise an auto-detecting input side of the SWC interface shown in FIG. 1.

FIGS. 2A and 2B each illustrate a circuit suitable for auto-detecting SWC signals in a vehicle that transmits SWC signals using a variable resistance method. Circuit 21 is one that determines a characteristic voltage of an SWC channel through the use of a pull-up resistor. This circuit can be suitable for use where the standby resistance of a channel pulls the channel to ground. Circuit 21 includes input port 24, output port 25, processor 26, analog-to-digital (A/D) converter 27, and resistance 28. Input port 24 provides an electrical connection to one or more SWC channels. Within the circuit, input port connects to resistance 28. Resistance 28 can be comprised of a single resistor, a variable resistor, or any suitable circuit element that allows for a voltage on the SWC channel to be measured. Resistance 28 pulls the output of the channel up to a voltage V, which can be determined according to design considerations and which may be variable. By virtue of resistance 28, the voltage at the input port 24 is a characteristic voltage of the SWC channel. This voltage is passed through A/D converter 27 and read by processor 26. As previously discussed, because the wiring schematics of steering wheel components can vary among makes and models, different vehicles can have different correlations of their characteristic voltages. Thus, processor 26 can include a recognition module, which can determine the particular configuration of the vehicle from among known configurations. These known configurations, which can be preprogrammed into the recognition module, allow the processor to recognize the resistance network of the steering wheel control circuit particular to the vehicle. In this manner, the variable resistances can be auto-detected and decoded for further processing and transmission an SWC interface. The output of processor 26, which can include characteristic voltage readings, resistance determinations, and information relating to a recognized resistance network, is passed to output port 25, which can be connected to other elements of an SWC interface.

Circuit 22 is similar to circuit 21 except that circuit 22 can be suitable for use where the standby resistance of an SWC channel pulls the channel up to a particular voltage, e.g., 5 V or 12 V. Circuit 22 can be comprised of the same elements as circuit 21 but in a slightly different configuration: circuit 22 differs from circuit 21 in that resistance 28 pulls the output of the channel down to ground. As in circuit 21, the resistance 28 causes the voltage at the input port 25 to be a characteristic voltage of the SWC channel. The other elements of circuit 22 can perform functions similar to those of circuit 21.

With regard to the circuits illustrated in FIGS. 2A and 2B, those having ordinary skill in the art will recognize that many other circuit designs may be suitable for detecting a characteristic voltage of an SWC channel. Although these figures illustrate circuits having both analog and digital elements, suitable circuits may be wholly digital or analog, and may incorporate other elements not discussed herein. Moreover, when comprising an input side of an SWC interface, there may be many such circuits employed. For example, if a vehicle transmits SWC signals over multiple channels, there may be that same number of individual circuits included in the SWC interface, with one circuit corresponding to each channel. Alternatively, there may be only one circuit used, with the circuit configured to measure a characteristic voltage of each channel. The invention is sufficiently flexible that those having skill in the art will be able to adapt it to any particular designs or applications.

FIG. 2C illustrates a bus-monitoring circuit 23, which can be suitable for auto-detecting SWC signals in a vehicle that transmits SWC signals on a bus. Circuit 23 includes input port 24, output port 25, processor 26, and line receiver 29. Input port 24 provides an electrical connection to the vehicle bus. Within the circuit, input port 24 connects to line receiver 29, which converts vehicle bus signals into logic level signals that are suitable for analysis by processor 26. Output from line receiver 29 is passed is processor 26. Processor 26 of circuit 23 can be configured to perform determinations different from the processors in circuits 21 and 22. Specifically, based upon the output from line receiver 29, processor 26 can auto-detect the bus data rate and the vehicle bus type. Processor 26 further can include hardware, software, or a combination thereof to detect commands present on the bus and decode those commands that relate to SWC signals. In this manner, SWC signals transmitted on the data bus can be auto-detected and decoded by the bus-monitoring circuit 23. The output of processor 26, which can include data relating to any of the information detected, decoded, or determined by it, is passed to output port 25, which can be connected to other elements of an SWC interface.

Line receiver 29 may be configured in various ways depending on the configuration of the vehicle bus. For example, data on a vehicle bus may transmitted by single-ended signals or by differential signals. Accordingly, line receiver 29 may be capable of receiving one or more types of signals. As another example, electrical signals on the vehicle bus may vary in amplitude; signal swing on one vehicle bus may be 100 mV, while on another vehicle bus signal swing may be 12 V. Line receiver 29 thus can be capable of converting various signal amplitudes to signals compatible with logic levels of processor 26. For example, line receiver 29 may output to processor 26 a 0 V to 5 V electrical signal.

One aspect of the invention is that an input side of an SWC interface can connect to vehicle components that transmit SWC signals. Embodiments of the invention according to this aspect have been described above. Another aspect of the invention is that an output side of an SWC interface can connect to an aftermarket component and auto-detect that component. In still another aspect of the invention, an SWC interface can deliver SWC signals to an aftermarket component. Embodiments according to these aspects will now be described.

Referring back to FIG. 1, the output side 13 of SWC interface 10 can be coupled to aftermarket component 18 via, for example, a wired connection. Most aftermarket components include a wired remote control input port at the rear of the component. That input port can accept command inputs from a wired remote control that is either bundled with the component or sold as an accessory. However, each manufacturer of aftermarket component uses different techniques to convey remote control signals. Thus, prior to SWC interface 10 providing SWC signals to aftermarket component 18, it may be necessary to determine the manufacturer or model of component 18 in order to provide SWC signals in a format recognizable by component 18.

Some aftermarket components utilize a variable resistance method that is similar to the variable resistance method for conveying SWC signals from a steering wheel component. In this method, a remote control that is electrically coupled to the input port contains a baseline resistance or voltage detectable even when the remote control is not being operated, e.g., when none of its buttons is depressed. Each button on the remote control corresponds to a unique change in resistance or voltage in the wired connection from the remote control to the aftermarket component input port.

Other aftermarket components utilize a digital waveform method that is similar to the use of light-emission waveforms for transmitting IR signals from a wireless remote control, except that the waveforms are transmitted over a wired connection. Each button on the remote control is associated with a unique modulation sequence. When a button is depressed, a pulsed electrical signal generated according to the associated sequence is transmitted from the remote control to the aftermarket component input port.

Output side 13 can perform an auto-detection of aftermarket component 18 by analyzing the electrical characteristics of its input port. In typical aftermarket components, the input port is pulled up to a particular internal supply voltage $V_{cc}$ by a particular resistance. As with the variable resistance methods for factory steering wheel components, however, there are other input port configurations. For example, some manufacturers may design their components such that their remote control input ports are pulled down to ground. The invention is sufficiently flexible that output side 13 can accommodate for variations in input port electrical characteristics.

One method for analyzing the electrical characteristics of an aftermarket component is to measure the open circuit voltage and the load voltage of the input port. Output side 13 can be configured to make these measurements. When measuring the load voltage, output side can be configured to draw a known current, such as 100 µA. Based upon the two voltages and the known current drawn, the pull-up or pull-down resistance of the input port can be determined. Using these electrical values, output side 13 (or a component to which it can communicate, such as signal processing components 12) can access a predetermined lookup table which correlates the electrical characteristics of component 18 to a particular manufacturer and/or model. In this manner, output side 13 can determine the particular manufacturer and/or model of the aftermarket component 18, and SWC interface 10 can associate itself with a set of electrical output signals that are correlated to respective remote control commands recognized by component 18. Accordingly, when the output side 13 receives a control command from input side 11 or signal processing components 12 indicating input from steering wheel component 14 or vehicle bus 16, the output side 13 can transmit an appropriate electrical signal to aftermarket component 18.

Figure 3:
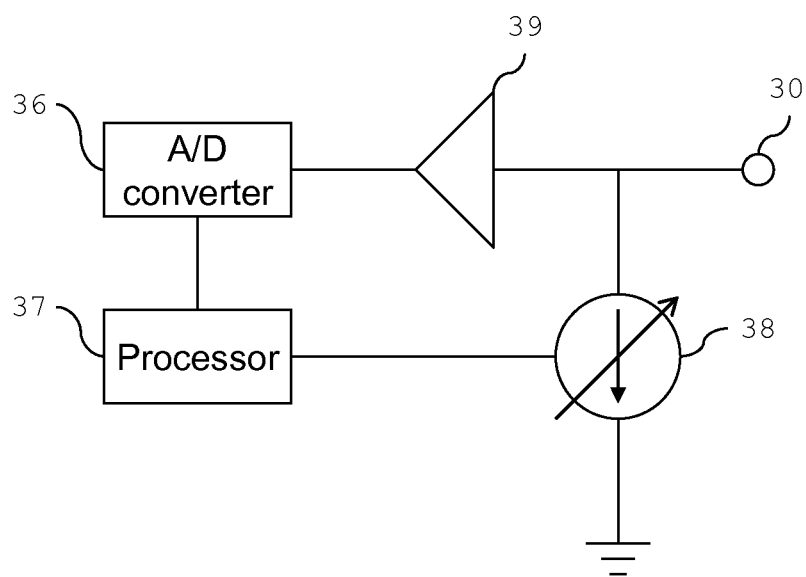
FIG. 3 shows a top-level block diagram of an example circuit according to still another aspect of the invention.

FIG. 3 shows a top-level block diagram of an example circuit capable of analyzing the input port of an aftermarket component. This circuit can comprise an auto-detecting output side of the SWC interface of FIG. 1. The circuit includes port 30, A/D converter 36, processor 37, current source 38, and buffer 39. Port 30 can be electrically coupled to the input port of the aftermarket component. Current source 38 can be varied by processor 37 depending on whether a measurement of the open circuit voltage or the load voltage is desired. Processor 37 further can vary resistance 38 to control the current drawn through port 30. Analog voltages from the input port pass through buffer 39 and A/D converter 36 prior to reading by processor 37. Processor 37 can read and calculate the electrical characteristics of the input port. These characteristics can be sent to other components of an SWC interface, such as signal processing components 12.

In various embodiments if the invention, an output side of an SWC interface can transmit SWC signals to an aftermarket component following auto-detection of the component. Although transmission of SWC signals can proceed according to any suitable method, in one embodiment of the invention, an output side of an SWC interface is configured to transmit both variable resistance signals and digital waveform signals, depending on the auto-detection of an aftermarket component. Referring to the SWC interface of FIG. 1, in this embodiment output side 13 can include a variable resistance circuit and a digital waveform emission circuit.

A variable resistance circuit can include a regulated current sink that is driven by a pulse width modulated (PWM) output, an output operational amplifier, and a bipolar junction transistor. The PWM output is coupled to an input of the amplifier, and the output of the amplifier is coupled to the base of the bipolar junction transistor. By increasing or decreasing the duty cycle of the PWM, the DC voltage at the input of the amplifier is increased or decreased, respectively. Consequently, the amplifier output voltage (and base of the bipolar junction transistor) increases or decreases, which increases or decreases a current at the collector of the bipolar junction transistor. This current is drawn at the aftermarket component wired input port by, for example, a pull-down resistor. An increasing current through the pull-down resistor may be interpreted by the aftermarket component as a remote control command according to its predetermined configuration. While other methods of reproducing a variable resistance are possible, and may be interchangeable with the method of the circuit just described, the use of a variable PWM signal can allow for flexibility in variable resistance values.

For transmission of digital waveforms, a digital waveform emission circuit can generate a modulated signal pattern replicating a known pattern corresponding to a particular remote control command for the particular manufacturer of the aftermarket component. The circuit then can transmit the signal pattern via the wired link to the aftermarket component using any one of a variety of known modulated signal transmission techniques.

Figure 4:
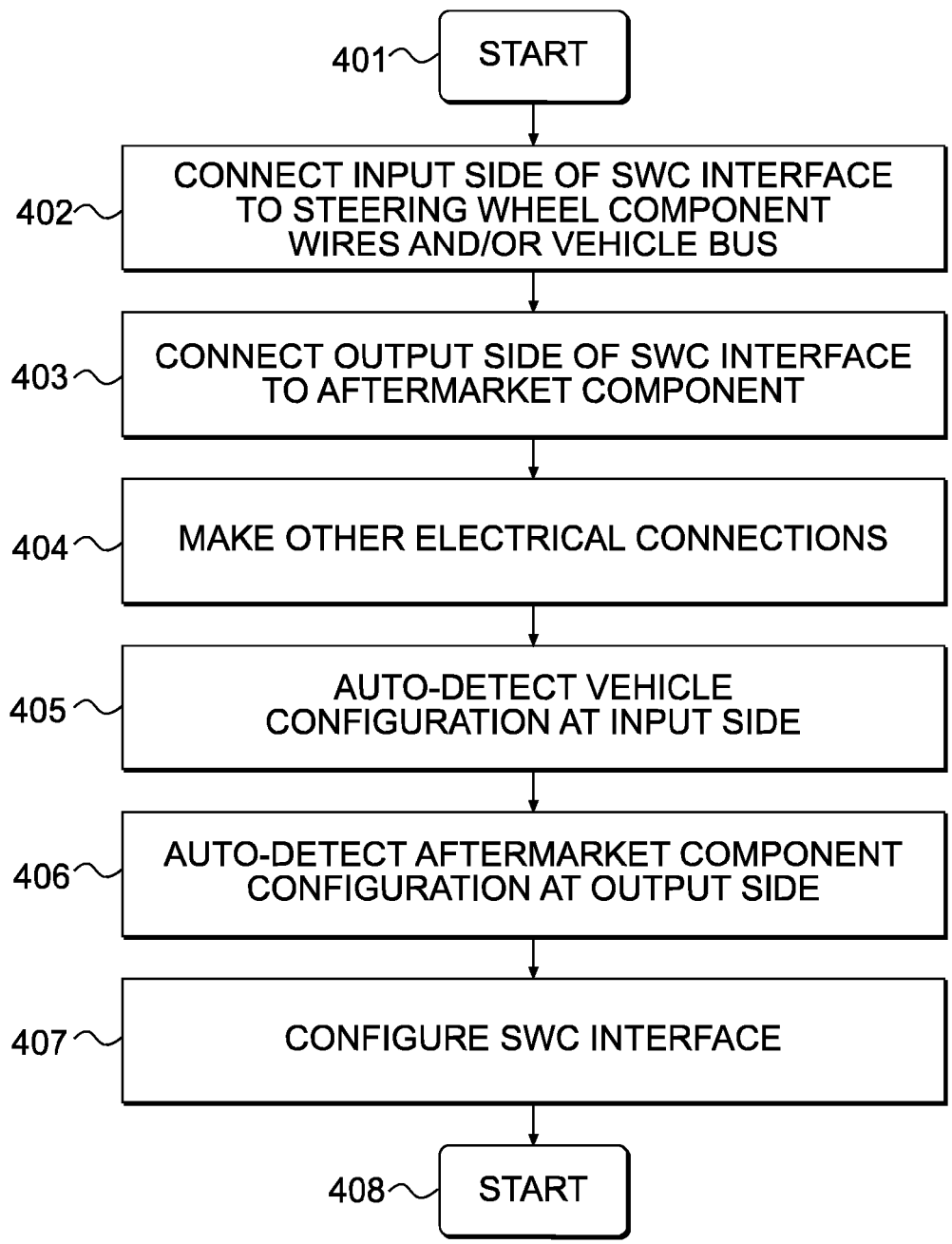
FIG. 4 illustrates a method of installing and configuring a device according to various embodiments of the invention.

FIG. 4 illustrates an example method of installing and configuring a device such as the SWC interface of FIG. 1. The method begins at step 401. Prior to this step, an aftermarket component, which may be replacing a factory-installed component, has been installed in a vehicle, and any typical connections, such as power, video, or audio connections, may have been made. At step 402, an input side of the SWC interface is electrically connected to the vehicle. Depending on the particular vehicle in which the SWC interface is being installed, this step may include connecting the SWC interface to one or more steering wheel component wires and connecting the interface to the vehicle's data bus. Step 402 may require splicing or cutting factory-installed wires and may involve proprietary electrical connectors. At step 403, an output side of the SWC interface is electrically connected to the aftermarket component. In some instances, the connection may be made simply by plugging into a jack provided in the aftermarket component. However, in other instances step 403 may require wiring similar to step 402. At step 404, other electrical connections are made. These connections may be required for the SWC operate or function properly and may include, for example, connecting a power wire to the SWC interface, connecting an accessory power wire from the aftermarket component to the SWC interface, or connecting a ground wire from a steering wheel component to the aftermarket component. At step 405, the vehicle configuration is auto-detected at the input side of the SWC interface, and at step 406, the aftermarket component configuration is auto-detected at the output side of the SWC interface. Detection at step 405 can include auto-detection of a variable resistance network of steering wheel components or auto-detection of a vehicle data bus, as previously described. Detection at step 406 can include auto-detection at an input port of the aftermarket component. As discussed below in connection with FIGS. 5 and 6, if an auto-detecting step is unable to sufficiently identify a configuration of the vehicle or the aftermarket component, the SWC interface can prompt a user to configure the SWC interface manually. Based on the auto-detection at steps 405 and 406 (and any corresponding manual configuration), at step 407 the SWC interface can internally configure itself to transmit SWC signals to the aftermarket component. The method terminates at step 408.

Figure 5:
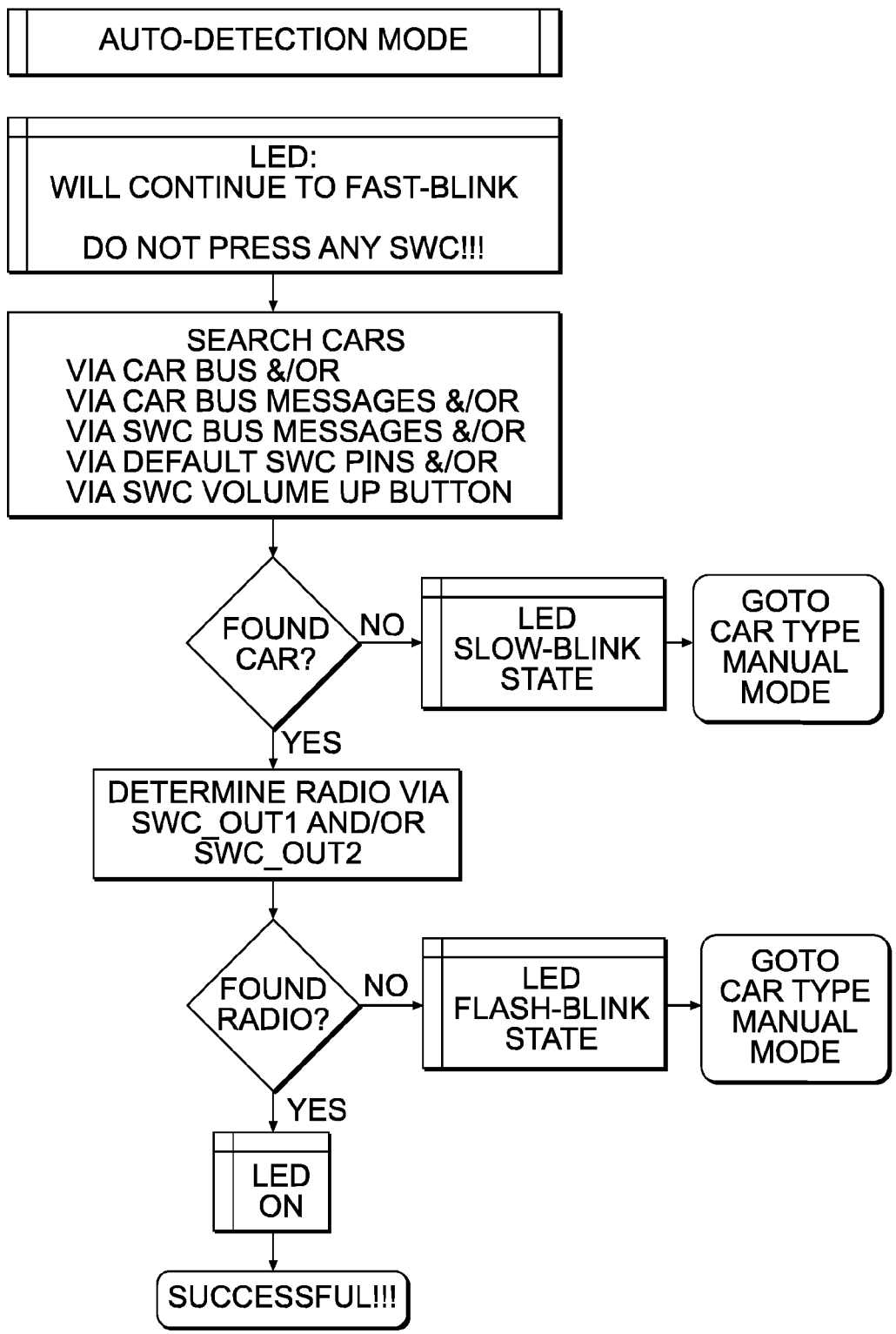
FIG. 5 shows a method of auto-detecting a vehicle configuration and an aftermarket component according to an embodiment of the invention.

A set of steps that may comprise steps 405 and 406 is shown in FIG. 5. As shown in this figure, an LED or other indicator on the SWC interface can inform a user that auto-detection is in process. When auto-detecting the vehicle configuration, as would be the case in step 405, the SWC interface can search for pertinent data or electrical information via several ways, including the vehicle bus and steering wheel components. If the vehicle is sufficiently identified by that data or information, the SWC interface can proceed to auto-detect the aftermarket component configuration. However, if the vehicle configuration cannot be sufficiently identified, a user can be prompted to manually configure the SWC interface with the vehicle information, as discussed below in connection with FIG. 6A. After the SWC interface has determined the vehicle configuration (whether by auto-detection or manual entry), the interface can auto-detect the aftermarket component configuration according to step 406. If the aftermarket component configuration cannot be sufficiently identified by auto-detection, a user can be prompted to manually configure the SWC interface with the aftermarket configuration, as discussed below in connection with FIG. 6B. After the SWC interface has determined the aftermarket configuration (whether by auto-detection or by manual entry), the SWC interface can proceed to indicate that detection is successful (and, in the method of FIG. 4, proceed to step 407).

Figure 6A:
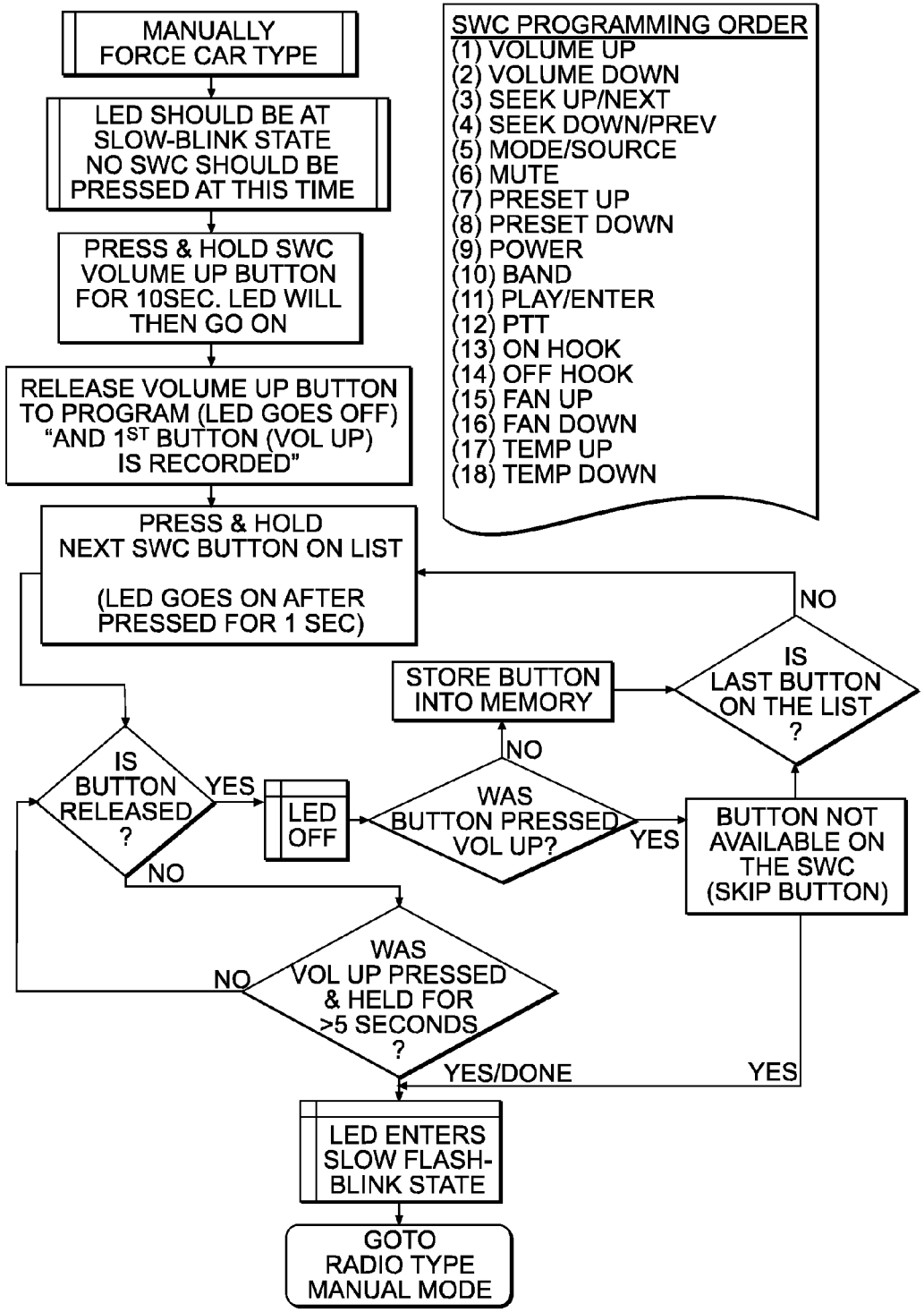
FIG. 6A shows a method of manually configuring an SWC interface.
Figure 6B:
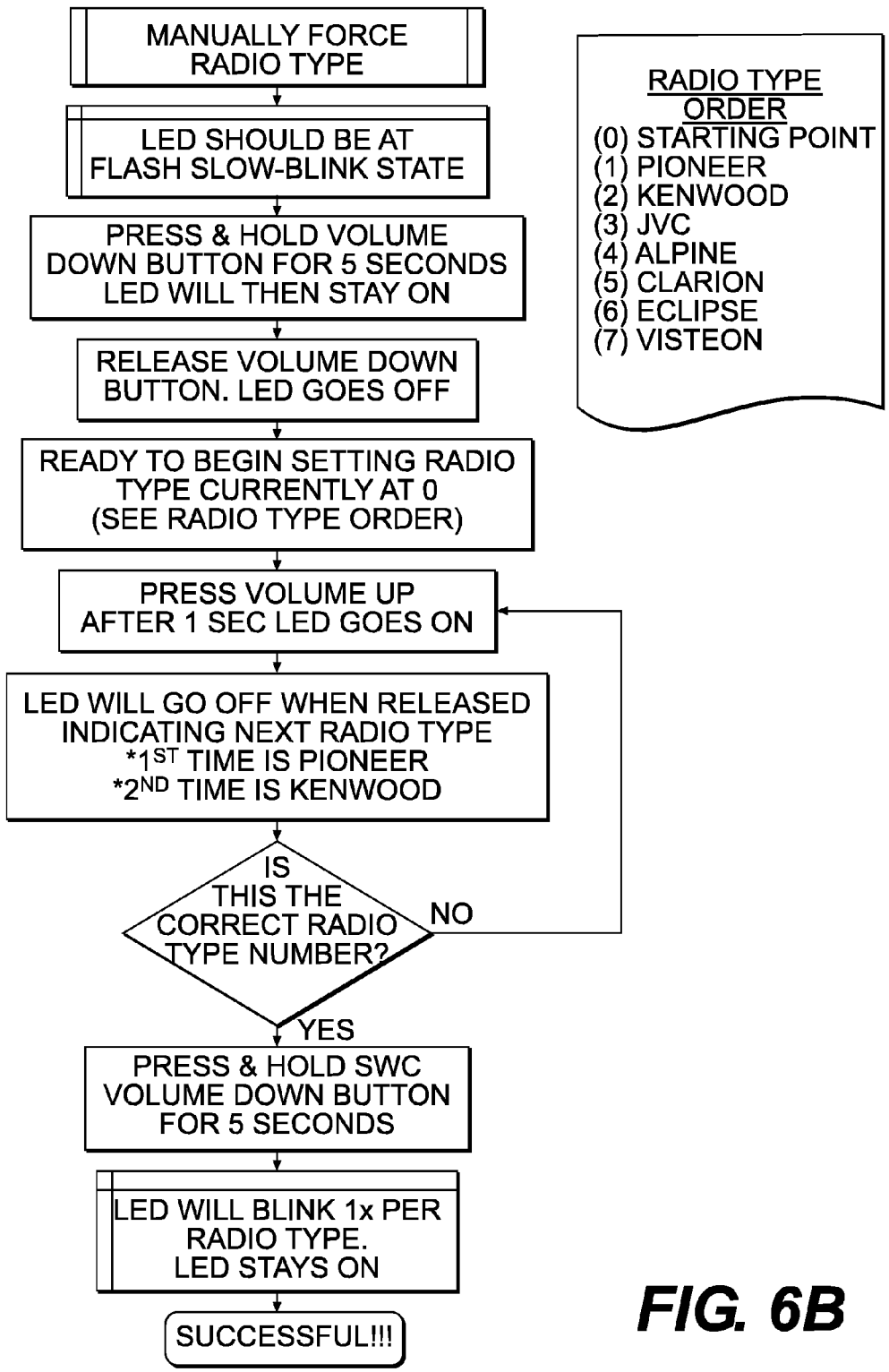
FIG. 6B shows another method of manually configuring an SWC interface.

FIGS. 6A and 6B show example methods for manually configuring an SWC interface with a vehicle configuration and an aftermarket component configuration, respectively. As shown in these figures, manual configuration can be accomplished through operation of steering wheel control components. Such operation can both program the SWC interface to recognize SWC signals and be used for entry of information. During manual configuration, the SWC interface can provide feedback to the user by, for example, visual indicators such as LEDs.

An SWC interface can be manually configured in ways other than those shown in FIGS. 6A and 6B. In some embodiments of the invention, a manual configuration routine can be used to alter the assignment or function of steering wheel control components. For example, an installer can swap a "seek up" button with a "volume up" button or change a "source" button to a "preset" button. Furthermore, such a reassignment or remapping of functions can be performed by any user of the SWC interface—e.g., an installer, a vehicle owner, or a later purchaser of the vehicle—anytime after installation and configuration of the SWC interface. Unlike devices similar to those discussed in the Background of the Invention, some embodiments of the invention can be remapped using only SWC signals generated by SWC components. That is, user input from SWC components, e.g., steering wheel buttons, can be sufficient to remap an SWC interface; no physical interaction with the installed SWC interface may be required.

In the foregoing description, example aspects of the present invention are described with reference to specific example embodiments. Despite these specific embodiments, many additional modifications and variations would be apparent to those skilled in the art. Thus, it is to be understood that example embodiments of the invention may be practiced in a manner other than those specifically described. For example, although one or more example embodiments of the invention may have been described in the context of steering wheel control components, in practice the example embodiments may include interfaces that auto-detect vehicle and aftermarket component configurations for the purpose of transmitting signals other than SWC signals. Accordingly, the specification is to be regarded in an illustrative rather than restrictive fashion. It will be evident that modifications and changes may be made thereto without departing from the broader spirit and scope.

Similarly, it should be understood that the figures are presented solely for example purposes. The architecture of the example embodiments presented herein is sufficiently flexible and configurable such that it may be practiced in ways other than that shown in the accompanying figures.

Furthermore, the purpose of the foregoing abstract is to enable the U.S. Patent and Trademark Office, the general public, and scientists, engineers, and practitioners in the art who are unfamiliar with patent or legal terms or phrases, to quickly determine from a cursory inspection the nature and essence of the technical disclosure of the application. The abstract is not intended to limit the scope of the present invention in any way. It is also to be understood that the processes recited in the claims need not be performed in the order presented.

What is claimed is:

1. A method for automatically detecting a configuration of a vehicle using an auto-detection apparatus, the method comprising the steps of:
   identifying, by the auto-detection apparatus, a frame rate of a data bus of the vehicle, wherein the auto-detection apparatus includes:
      an input unit electrically connectable to at least one channel of the data bus of the vehicle;
      a storage unit that stores information including: (i) data bus configuration information corresponding to a plurality of vehicle data busses, and (ii) vehicle configuration information corresponding to a plurality of vehicles; and
      a signal processing unit coupled to the input unit;
   identifying, by the auto-detection apparatus, a data bus configuration of the data bus of the vehicle based at least partially on the identified frame rate and the data bus configuration information stored in the storage unit of the auto-detection apparatus; and identifying, by the auto-detection apparatus, the configuration of the vehicle based at least partially on the identified data bus configuration and the vehicle configuration information stored in the storage unit of the auto-detection apparatus.

2. A method according to claim 1, wherein said data bus configuration identifying step includes identifying a data bus type of the data bus of the vehicle.

3. A method according to claim 2, wherein said data bus type identifying step includes identifying the data bus type from among a plurality of types including at least one of a J1850 bus, a CAN-BUS, and a K-BUS.

4. A method according to claim 1, wherein said vehicle configuration identifying step includes identifying at least one of a make, a model, and a model year of the vehicle.

5. A method according to claim 1, wherein said data bus configuration identifying step is based also on identified data bus signals received from the at least one channel.

6. A method according to claim 1, further comprising:
receiving data bus signals from an input port of the auto-detection apparatus; and
outputting logic signals to the at least one processor.

7. A method according to claim 6, further comprising:
converting a first signal amplitude of the data bus signals, from among a plurality of potential signal amplitudes corresponding to a plurality of potential data bus configurations, to a second signal amplitude of the logic signals, the second signal amplitude being compatible with the at least one processor.

8. A method according to claim 6, wherein a line receiver of the auto-detection apparatus is adapted to receive both single-ended signals and differential signals from the input port and to output the logic signals having a signal type compatible with the at least one processor.

9. A non-transitory computer-readable medium having a program stored thereon which, when executed, causes an auto-detection apparatus, which includes a processor, to perform the method of claim 1.

10. An apparatus comprising:
an input unit electrically connectable to at least one channel of a data bus of a vehicle;
a storage unit that stores information including: (i) data bus configuration information corresponding to a plurality of vehicle data busses, and (ii) vehicle configuration information corresponding to a plurality of vehicles; and
a signal processing unit coupled to said input unit,
wherein said signal processing unit is adapted to auto-detect a configuration of the vehicle, by:
(i) identifying a frame rate of the data bus of the vehicle,
(ii) identifying a data bus configuration of the data bus of the vehicle based at least partially on the identified frame rate and the data bus configuration information stored in said storage unit, and
(iii) identifying the configuration of the vehicle based at least partially on the identified data bus configuration and the vehicle configuration information stored in said storage unit.

11. An apparatus according to claim 10, wherein said input unit includes:
an input port electrically connectable to at least one channel of the data bus of the vehicle, and
a line receiver adapted to receive data bus signals from said input port,
wherein said line receiver is adapted to output logic signals to said signal processing unit.

12. An apparatus according to claim 11, wherein said line receiver is adapted to convert a first signal amplitude of the data bus signals, from among a plurality of potential signal amplitudes corresponding to a plurality of potential data bus configurations, to a second signal amplitude of the logic signals, the second signal amplitude being compatible with the signal processing unit.

13. An apparatus according to claim 11, wherein said line receiver is adapted to receive both single-ended signals and differential signals from said input port and to output the logic signals having a signal type compatible with said signal processing unit.

14. An apparatus according to claim 10, wherein the identifying a data bus configuration includes identifying a data bus type of the data bus of the vehicle.

15. An apparatus according to claim 14, wherein the identifying a data bus type includes identifying the data bus type from among a plurality of types including at least one of a J1850 bus, a CAN-BUS, and a K-BUS.

16. An apparatus according to claim 10, wherein the identifying a configuration of the vehicle includes identifying at least one of a make, a model, and a model year of the vehicle.

17. An apparatus according to claim 10, wherein the identifying the data bus configuration is based also on identified data bus signals received from the at least one channel.

* * * * *